US005663844A

United States Patent [19]
Gohda et al.

[11] Patent Number: 5,663,844
[45] Date of Patent: Sep. 2, 1997

[54] SIGNAL REPRODUCING APPARATUS HAVING WAVEFORM EQUALIZING FUNCTION

[75] Inventors: Makoto Gohda, Tokyo; Shinichi Yamashita, Kanagawa-ken, both of Japan

[73] Assignee: Canon Kabushiki Kaisha, Tokyo, Japan

[21] Appl. No.: 156,408

[22] Filed: Nov. 19, 1993

Related U.S. Application Data

[63] Continuation of Ser. No. 791,990, Nov. 14, 1991, abandoned.

[30] Foreign Application Priority Data

| Nov. 19, 1990 | [JP] | Japan | 2-311273 |
| Nov. 19, 1990 | [JP] | Japan | 2-311282 |
| Mar. 22, 1991 | [JP] | Japan | 3-058965 |

[51] Int. Cl.⁶ ............................................. G11B 5/035
[52] U.S. Cl. ............................................. 360/65; 386/113
[58] Field of Search ........................... 360/65, 27, 33.1; 386/9, 93, 113; 348/123, 711

[56] References Cited

U.S. PATENT DOCUMENTS

| 3,643,013 | 2/1972 | Lemoine | 360/27 |
| 4,807,056 | 2/1989 | Sasaki et al. | 360/27 |
| 5,105,315 | 4/1992 | Bannai et al. | 360/27 X |
| 5,124,850 | 6/1992 | Kizu | 360/33.1 |
| 5,200,835 | 4/1993 | Sakamoto | 358/330 |
| 5,543,974 | 8/1996 | Sugita | 360/65 X |

FOREIGN PATENT DOCUMENTS

| 62-219372 | 9/1987 | Japan | 360/65 |
| 1-192062 | 8/1989 | Japan | 360/65 |

OTHER PUBLICATIONS

"Introduction to Circuit Synthesis and Design" by Temes and LaPatna 1977, pp. 14–17.
"Signals and Systems" by Oppenheim, Willsky and Young p. 457 1983.

*Primary Examiner*—Andrew L. Sniezek
*Attorney, Agent, or Firm*—Robin, Blecker, Daley & Driscoll

[57] ABSTRACT

A circuit is provided for emphasizing or suppressing both a frequency corresponding to an upper sideband and a frequency corresponding to a lower sideband with respect to a frequency corresponding to the carrier of a frequency-modulated signal in equalizing the frequency-modulated signal reproduced from the recording medium. With this arrangement, it is possible to effectively compensate for the nonlinearity of a magnetic recording and reproducing system even in the case of a wide deviation. Also, the envelope levels of the portions of a frequency-modulated signal which are formed by frequency-modulating portions of a signal whose levels differ from each other, are extracted to adjust the equalizing characteristics of the equalizing circuit in accordance with the difference between the levels, whereby variations in the characteristics of a reproduction equalizing circuit due to variations with time can be appropriately compensated for.

17 Claims, 13 Drawing Sheets

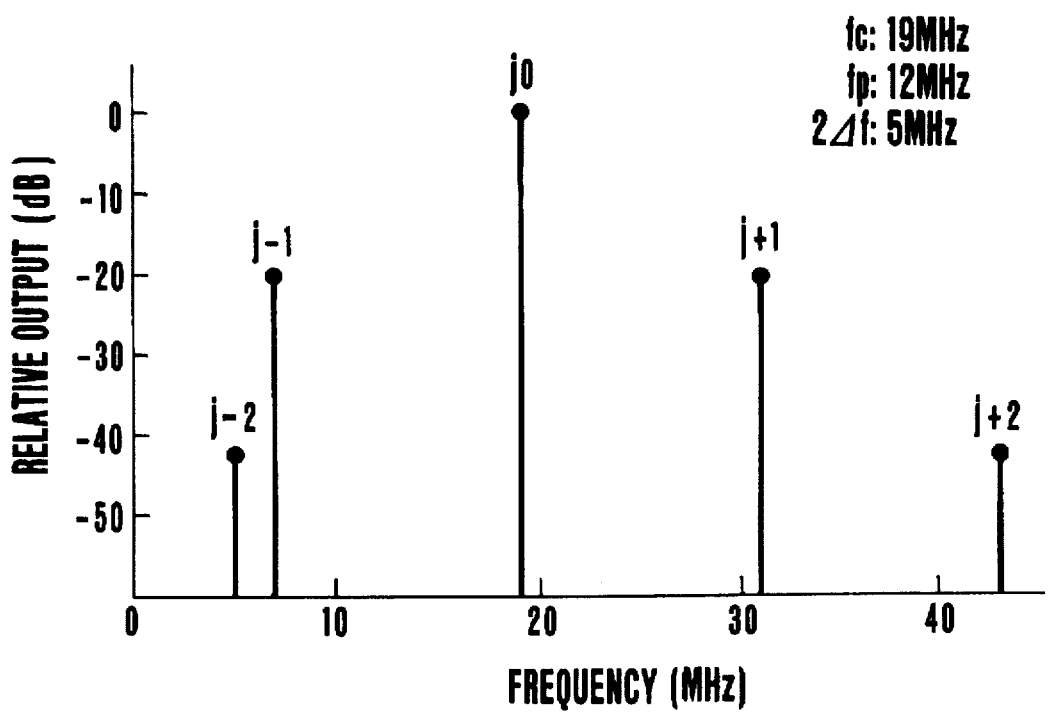

SIGNAL REPRODUCING APPARATUS HAVING WAVEFORM EQUALIZING FUNCTION

This is a continuation application under 37 CFR 1.62 of prior application Ser. No. 791,990, filed Nov. 14, 1991, now abandoned.

BACKGROUND OF THE INVENTION

1. Field of the Invention

The present invention relates to a signal reproducing apparatus and, more particularly, to a signal reproducing apparatus having the function of reproducing a frequency-modulated signal and equalizing the waveform thereof.

2. Description of the Related Art

A so-called cosine equalizer is used as a waveform equalizer which is provided in a reproducing part of a video tape recorder (VTR) which employs a conventional low-frequency-carrier frequency-modulated recording system.

FIG. 1 is a schematic block diagram showing the construction of the magnetic recording and reproducing system of a conventional VTR.

A modulating signal, such as a video signal, inputted through an input terminal It is frequency-modulated in a frequency modulator 1, then amplified in a recording amplifier 2, and then written to a magnetic tape 5 via a rotary transformer 3 by a rotary magnetic head 4.

During reproduction, a signal recorded on the magnetic tape 5 is read by a rotary magnetic head 6, then supplied to a reproducing amplifier 8 through a rotary transformer 7, and then amplified by the reproducing amplifier 8. The frequency characteristics of the thus-amplified signal are corrected for a magnetic reproducing part by a frequency-characteristic compensating circuit (FQ-CP) 9, and the losses suffered by the signal in the magnetic recording part are compensated for in a cosine equalizer 10. The resultant signal is frequency-demodulated in a frequency demodulator 12 and outputted through an output terminal Ot.

The FQ-CP 9 constitutes a transmission path which has the inverse characteristics of the resonance characteristics of a reproducing circuit consisting of the magnetic head 6, the rotary transformer 7, the reproducing amplifier 8 and so on. Accordingly, the output signal of the FQ-CP 9 is provided as a signal which has suffered losses only in the magnetic recording and reproducing system, with respect to the output signal of the frequency modulator 1.

The influence of the magnetic recording and reproducing system on the signal will be described below with reference to FIGS. 2 and 3.

FIG. 2 shows a spectrum distribution of a frequency-modulated signal outputted from the frequency modulator 1 of FIG. 1, and the shown example represents a spectrum distribution obtainable when a carrier frequency (j0) is 19 MHz; the frequency of a modulating signal, 12 MHz; and a deviation, 5 MHz. In each of FIGS. 2 and 3, j+1, j−1, j+2 and j−2 represent sideband spectra, respectively. When this frequency-modulated signal is recorded and reproduced, the spectrum distribution of the output signal of the FQ-CP 9 is as shown in FIG. 3. It is seen from FIG. 3 that an upper sideband is suppressed with a lower sideband emphasized as a result of the magnetic recording and reproducing process.

To compensate for such waveform distortion due to the magnetic recording and reproducing system, the cosine equalizer 10 of FIG. 1 is provided. The characteristic of the cosine equalizer 10 is shown in FIG. 4 and a conceptual diagram of its circuit, in FIG. 5.

The circuit shown in FIG. 5 includes a multiplier 13, current sources 14a and 14b, a delay line 15 (delay time τ), and a matching resistor 16 for the delay line 15. It is assumed here that an input signal ei of FIG. 5 is represented as:

$$ei = Ee^{j\omega t} \tag{1}$$

Since only one side of the delay line 15 is terminated, the signal is reflected on the other side which is not terminated. Therefore, an output signal eo becomes:

$$\begin{aligned} e_o &= Ee^{j\omega(t+\tau)} + aEe^{j\omega t} + aEe^{j\omega(t+2\tau)} \\ &= Ee^{j\omega(t+\tau)}\{1 + 2a\cos\omega\tau\} \end{aligned} \tag{2}$$

and displays a characteristic such as that shown in FIG. 4 in the case of a=−⅓ or −⅙.

It is to be noted that the value of the coefficient a of the multiplier 13 which determines the characteristic of the cosine equalizer 10 is selected in advance so as to minimize the deterioration of image quality, by actually recording and reproducing various kinds of images.

However, the cosine equalizer of the above-described conventional example is unable to sufficiently compensate for losses suffered by a frequency-modulated signal of wide deviation in the magnetic recording part.

In a VTR which requires high image quality, such as a VTR for business use, the deviation is set wide to attain high S/N, so that the nonlinearity of the magnetic recording part appears noticeably. This will be described below with reference to FIGS. 6 and 7.

FIG. 6 is a graphic representation illustrating three spectra of the frequency-modulated signal having the spectrum distribution shown in FIG. 2, the carrier j0, a first lower sideband j−1 and a first upper sideband j+1, and the relative values of the three spectra with respect to the original carrier level are plotted for several deviations. The horizontal axis of FIG. 6 represents the deviations and shows that recording and reproduction with a maximum deviation of approximately 20 MHz have been carried out. In this case, the modulation degree exceeds 0.8, which indicates quite a wide deviation compared to a typical VTR.

FIG. 7 is a graphic representation in which three spectra of the output signal of the FQ-CP 9 obtained by recording and reproducing the signal of FIG. 6 are plotted in a manner similar to that of FIG. 6.

As can be seen from FIGS. 6 and 7, the first lower sideband j−1 is emphasized with the first upper sideband j+1 suppressed, and when the deviation is set wide, the carrier j0 itself is suppressed as well.

This phenomenon is caused by the nonlinearity of the magnetic recording and reproducing system and is unable to be completely compensated for by the cosine equalizer explained in connection with the conventional example.

An additional drawback of the above-described conventional example is that if the recording and reproducing characteristics vary due to variations with time, residual equalization error increases to deteriorate image quality. In particular, the variations of the magnetic recording and reproducing characteristics due to the wear of a magnetic head have been a great cause of the deterioration of image quality.

SUMMARY OF THE INVENTION

It is, therefore, an object of the present invention to solve the above-described problems.

Another object of the present invention is to provide a signal reproducing apparatus capable of compensating for the nonlinearity of a magnetic recording and reproducing system.

To achieve the above-described objects, according to one aspect of the present invention, there is provided a reproducing apparatus which comprises reproducing means for reproducing a frequency-modulated signal from a recording medium and equalizing means for equalizing the frequency-modulated signal reproduced by the reproducing means. The equalizing means includes a sideband equalizing circuit for emphasizing or suppressing both a frequency corresponding to an upper sideband and a frequency corresponding to a lower sideband with respect to a frequency corresponding to a carrier of the frequency-modulated signal.

Still another object of the present invention is to provide a signal reproducing apparatus capable of compensating for the variations of magnetic recording and reproducing characteristics due to variations with time.

To achieve the above object, according to another aspect of the present invention, there is provided a reproducing apparatus which comprises reproducing means for reproducing from a recording medium a frequency-modulated signal containing a ramp portion having a ramp waveform which is frequency-modulated, equalizing means for equalizing the frequency-modulated signal reproduced by the reproducing means, and adjusting means for adjusting an equalizing characteristic of the equalizing means in accordance with an envelope level of the ramp portion in the frequency-modulated signal passed through the equalizing means.

According to still another aspect of the present invention, there is provided a reproducing apparatus which comprises reproducing means for reproducing a frequency-modulated signal from a recording medium, equalizing means for equalizing the frequency-modulated signal reproduced by the reproducing means, and adjusting means for extracting envelope levels of portions in the frequency-modulated signal which are formed by frequency-modulating portions of a signal whose levels differ from each other in the frequency-modulated signal passed through the equalizing means, and adjusting an equalizing characteristic of the equalizing means in accordance with a difference between the envelope levels.

The above and other objects, features and advantages of the present invention will become apparent from the following detailed description of preferred embodiments of the present invention, taken in conjunction with the accompanying drawings.

BRIEF DESCRIPTION OF THE DRAWINGS

FIG. 2 is a schematic illustration showing the spectrum distribution of a frequency-modulated signal outputted from the frequency modulator of FIG. 1;

FIG. 3 is a schematic illustration showing the spectrum distribution of a frequency-modulated signal outputted from the frequency-characteristic compensating circuit of FIG. 1;

DETAILED DESCRIPTION OF THE PREFERRED EMBODIMENTS

Preferred embodiments of the present invention will be described below with reference to the accompanying drawings.

Figure 1:
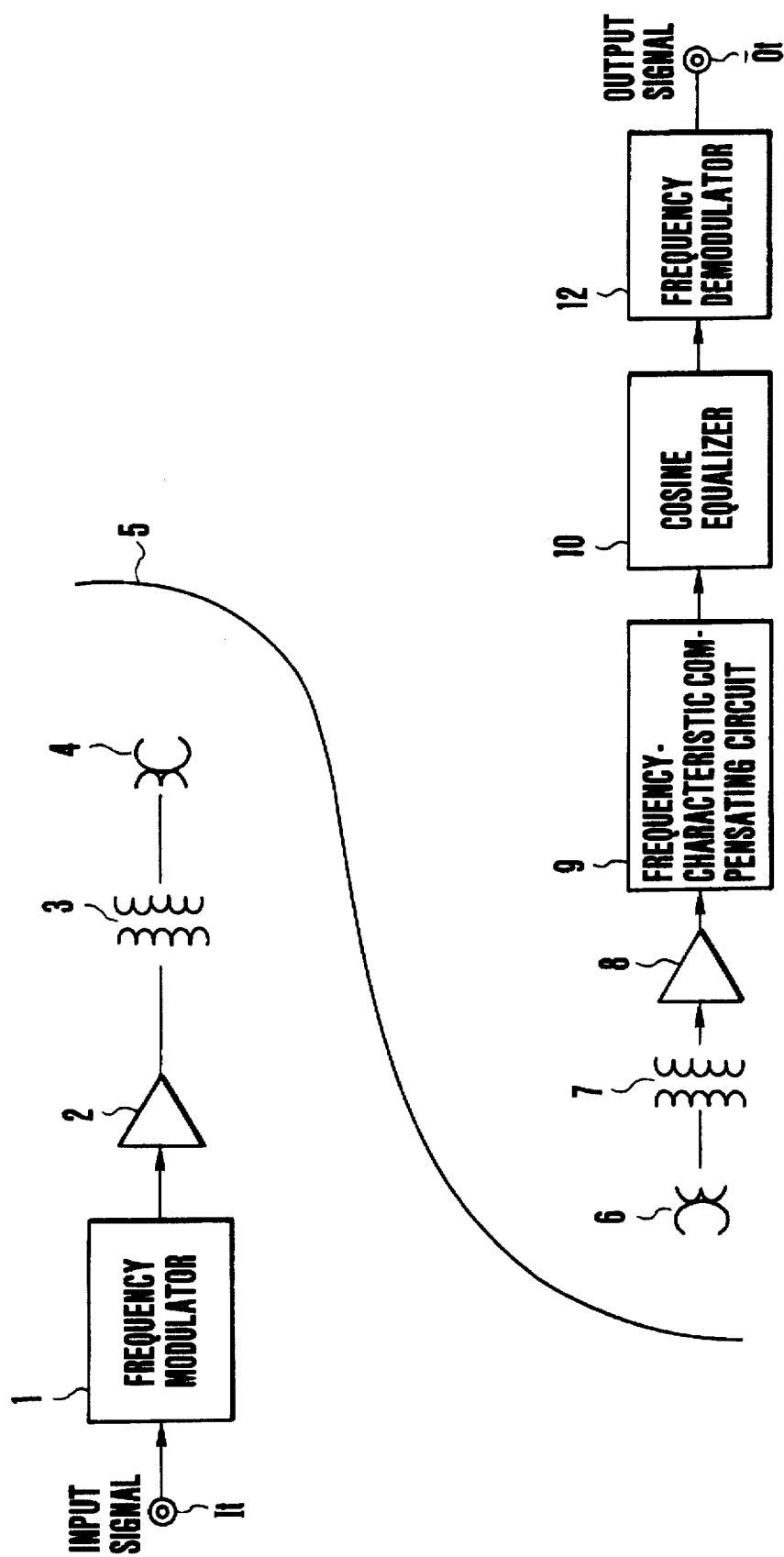
FIG. 1 is a schematic block diagram showing the construction of the magnetic recording and reproducing system of a conventional VTR.
Figure 4:
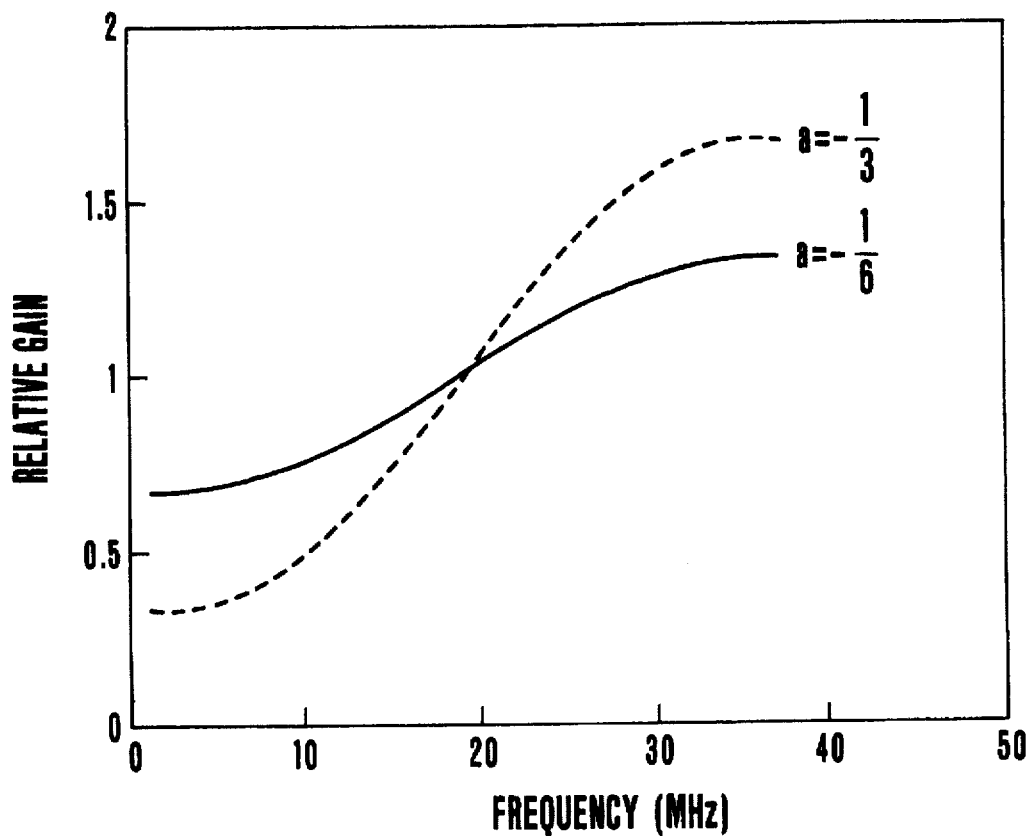
FIG. 4 is a schematic illustration showing the characteristic of the cosine equalizer of FIG. 1.
Figure 8:
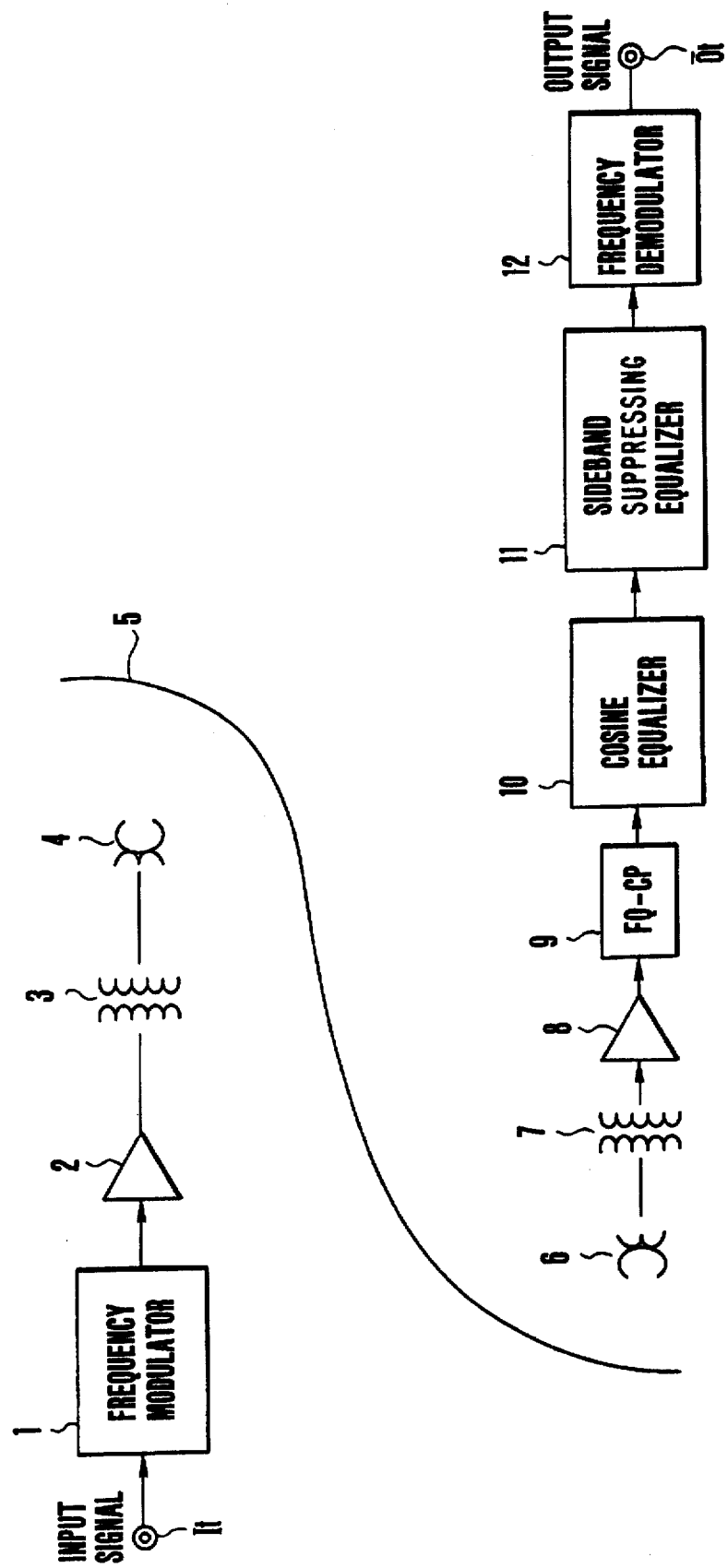
FIG. 8 is a schematic block diagram showing the construction of the magnetic recording and reproducing system of a VTR according to one embodiment of the present invention.

FIG. 8 is a schematic block diagram showing the construction of the magnetic recording and reproducing system of a VTR according to one embodiment of the present invention. In FIG. 8, the same reference numbers are used to denote constituent elements which are similar to those shown in FIG. 1, and a detailed description thereof is omitted.

In the VTR according to this embodiment, the output signal of a frequency-characteristic compensating circuit (FQ-CP) 9 is supplied to a cosine equalizer 10 and then to a sideband suppressing equalizer 11. These equalizers 10 and 11 compensate for the losses suffered by the signal in a magnetic recording part. The output signal from the sideband suppressing equalizer 11 is frequency-demodulated in the frequency demodulator 12 and the frequency-demodulated signal is supplied to an output terminal Ot.

Figure 9:
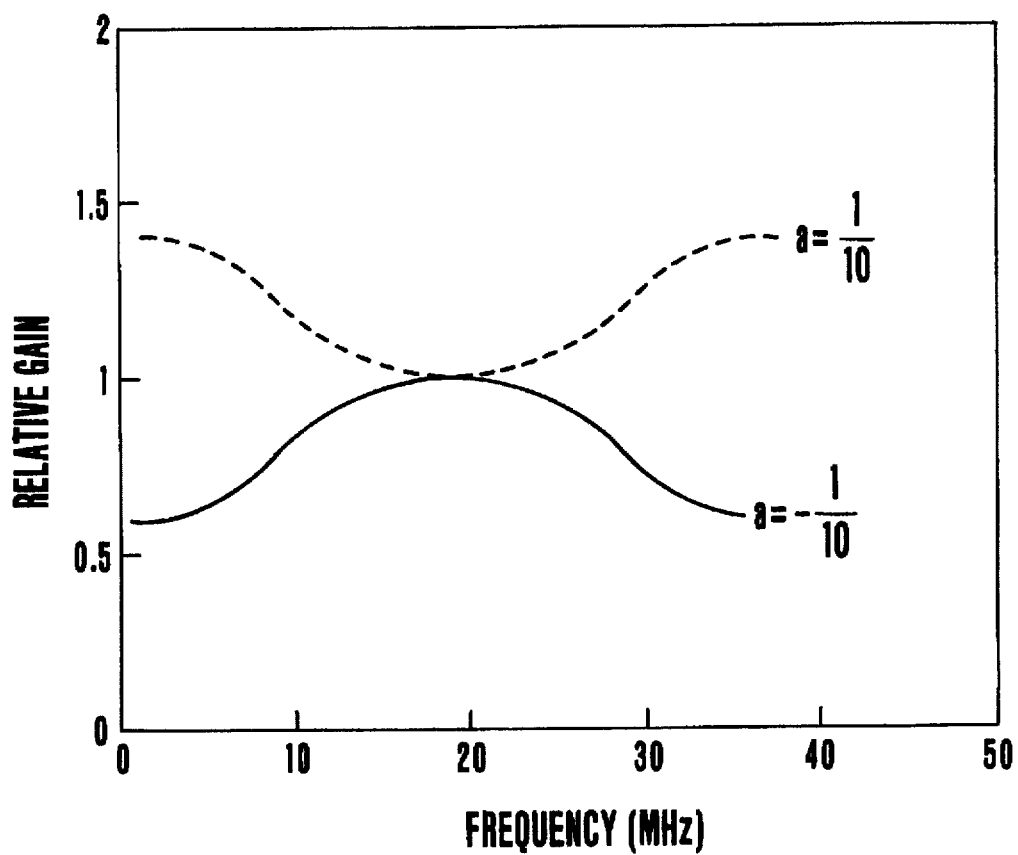
FIG. 9 is a schematic illustration showing the characteristic of the sideband suppressing equalizer of FIG. 8.
Figure 10:
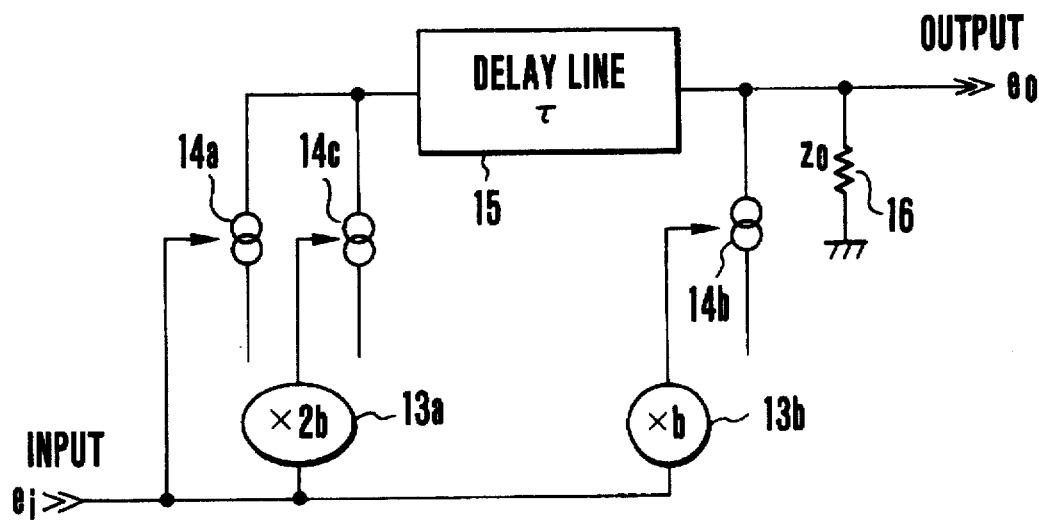
FIG. 10 is a conceptual diagram showing the circuit of the sideband suppressing equalizer of FIG. 8.

The characteristic of the sideband suppressing equalizer 11 is shown in FIG. 9 and a conceptual diagram of its circuit, in FIG. 10. The circuit shown in FIG. 10 includes multipliers 13a and 13b whose coefficients are 2b and b, respectively, current sources 14a, 14b and 14c, a delay line 15 (delay time τ), and a matching resistor 16 for the delay line 15. It is assumed here that an input signal ei is represented as:

$$e_i = E e^{j\omega t} \tag{3}$$

Since only one side of the delay line 15 is terminated, the signal is reflected on the other side which is not terminated. Therefore, an output signal eo is given by the following expression:

$$\begin{aligned} e_o &= E e^{j\omega(t+\tau)} + 2bE e^{j\omega(t+\tau)} + bE e^{j\omega t} + bE e^{j\omega(t+2\tau)} \\ &= E e^{j\omega(t+\tau)} \{1 + 2b + 2b\cos\omega\tau\} \end{aligned} \tag{4}$$

If it is assumed here that the delay amount τ of the delay line 15 is 26.3 ns, an equalizer characteristic such as that shown in FIG. 9 is obtained in which upper and lower sidebands are suppressed or emphasized at the same ratio about a carrier frequency. The ratio of suppression or emphasis of the sidebands can be varied with the coefficient b used in the multipliers 13a and 13b. If the coefficient b is negative, the equalizer characteristic of suppressing the sidebands is obtained, while if the coefficient b is positive, the equalizer characteristic of emphasizing the sidebands is obtained.

Figure 7:
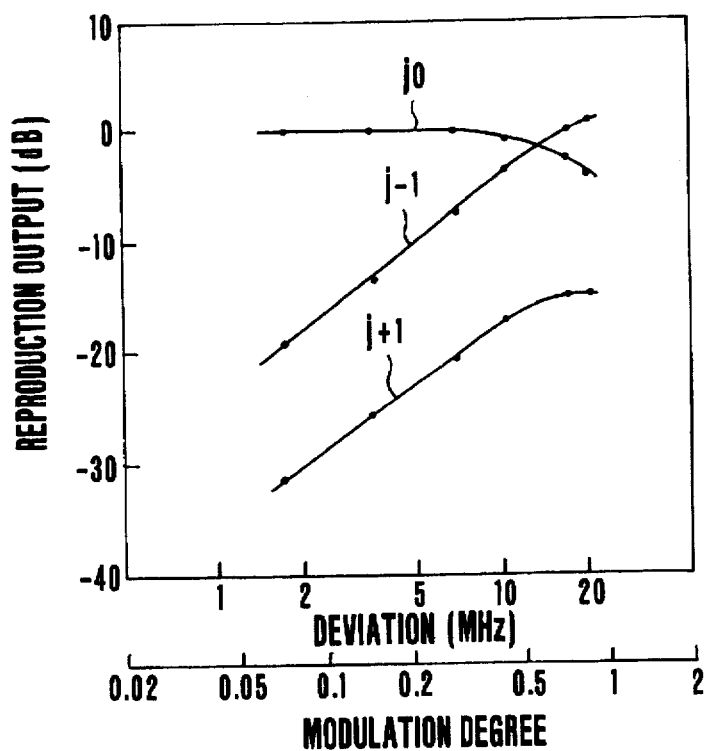
FIG. 7 is a schematic illustration showing the variation, due to deviation, of each spectrum of the frequency-modulated signal outputted from the frequency-characteristic compensating circuit of FIG. 1.

The spectrum of the frequency-modulated signal observed at the output of the FQ-CP 9 of FIG. 8 is in the state shown in FIGS. 3 and 7. As can be seen from FIGS. 3 and 7, the frequency-modulated signal suffers losses in the magnetic recording part and exhibits a nonlinear characteristic in which the carrier is suppressed, particularly in a region of wide deviation as shown in FIG. 7.

A case where a nonlinear characteristic appears noticeably in the region of a wide deviation corresponding to a modulation degree of 0.5 or more will be considered below.

If such a nonlinear characteristic is to be compensated for by the cosine equalizer 10 alone, it is necessary to emphasize a higher frequency band to a great extent in order to prevent occurrence of an inversion. This leads to the deterioration of the S/N of the video signal.

In addition, the fact that a carrier itself is suppressed in frequency modulation is equivalent to the fact that the intensity of frequency modulation increases apparently, which means that a higher frequency band is emphasized in the frequency characteristic of a frequency-demodulated video signal. The coefficient of the cosine equalizer 10 has been conventionally determined to balance this deterioration appropriately. However, it is apparent that the nonlinear behavior of the magnetic recording and reproducing system, i.e., the suppression of the carrier, cannot be compensated for by the cosine equalizer 10 alone.

However, if the cosine equalizer 10 and the sideband suppressing equalizer 11 are used in combination as shown in the block diagram of FIG. 8, it is possible to compensate for the losses more sufficiently than when conventional arts are used. That is to say, the causes of the losses in the magnetic recording and reproducing system are classified into two major categories, i) the suppression of the upper sideband and the emphasis of the lower sideband and ii) the suppression of the carrier, and the causes i) and ii) are respectively compensated for by the cosine equalizer and the sideband suppressing equalizer, thereby enabling sufficient compensation.

The coefficients of the two equalizers are selected to minimize image deterioration, but since the freedom of selection increases, more sufficient equalization is possible. In particular, the provision of the two equalizers is effective in preventing an inversion from occurring in the case of a wide deviation and in ensuring frequency demodulation of a video signal with good frequency characteristics.

As is apparent from the foregoing description, according to the aforesaid embodiment shown in FIGS. 8 to 10, it is possible to effect reproduction and equalization without any serious deterioration in image quality even in the case of a wide deviation.

Figure 11:
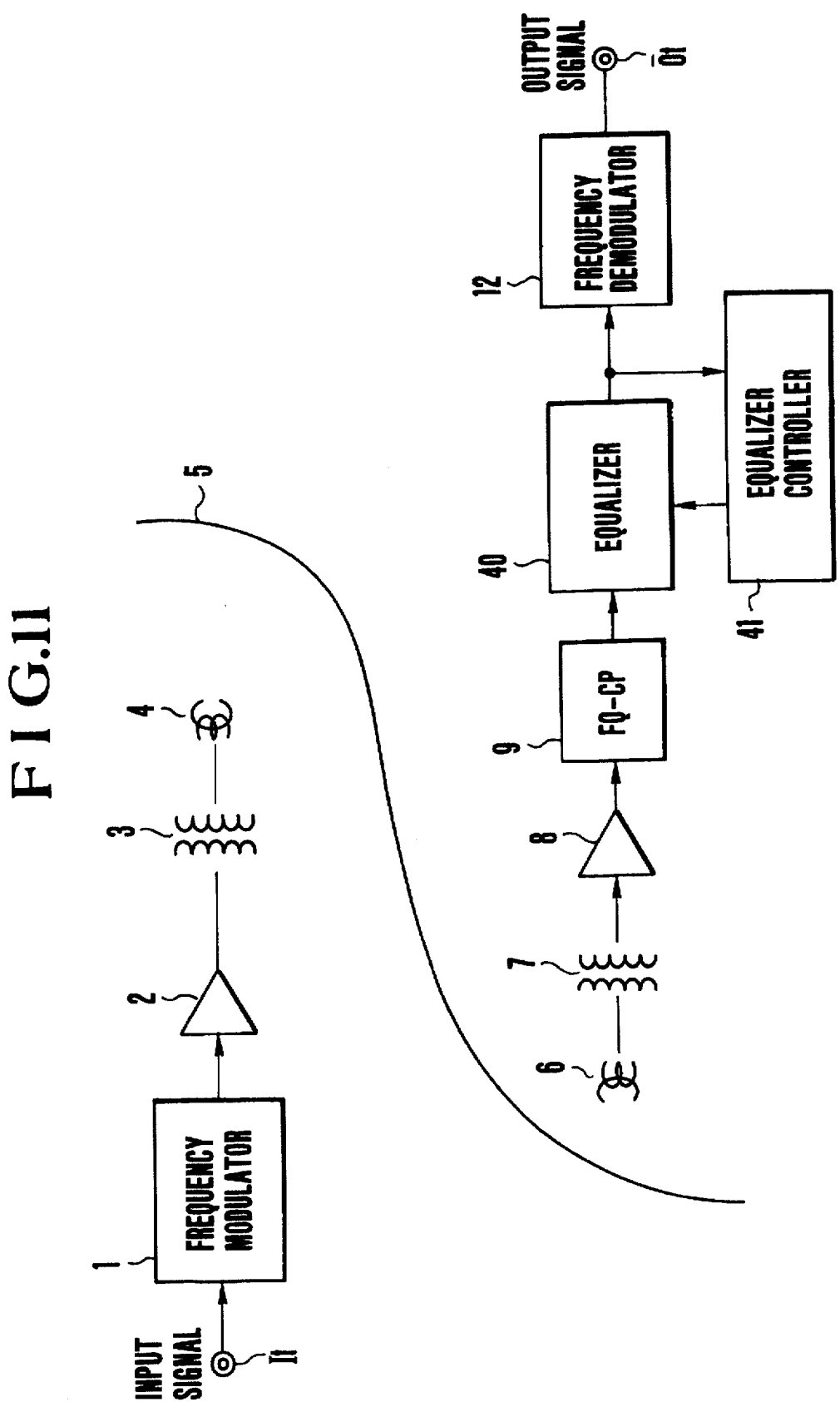
FIG. 11 is a schematic block diagram showing the construction of the magnetic recording and reproducing system of a VTR according to another embodiment of the present invention.

FIG. 11 is a schematic block diagram showing another embodiment of the present invention. In FIG. 11, the same reference numbers are used to denote constituent elements which are similar to those shown in FIG. 1, and a detailed description thereof is omitted.

Table 1 shows carrier frequencies in frequency modulation performed by the frequency modulator 1 in this embodiment.

TABLE 1

| | |
|---|---|
| Sync Tip Level | 14 MHz |
| Black Level | 16 MHz |
| White Level | 22 MHz |

If frequency modulation is performed with a modulating signal having a band of approximately 12 MHz and with a maximum deviation of approximately 20 MHz after emphasis, the band of the frequency-modulated signal becomes approximately 7 to 31 MHz.

The output signal of the FQ-CP 9 becomes a signal which has suffered losses only in the magnetic recording and reproducing system in the above-described manner. This signal is inputted into an equalizer 40, where the losses in the magnetic recording and reproducing system are compensated for. The output signal of the equalizer 40 is frequency-demodulated in the frequency demodulator 12 and outputted through the output terminal Ot.

In this embodiment, information indicative of equalization error variations is obtained from the output of the equalizer 40 and an equalizer controller 41 controls the equalizer 40 on the basis of the information, thereby performing automatic equalization.

Figure 12:
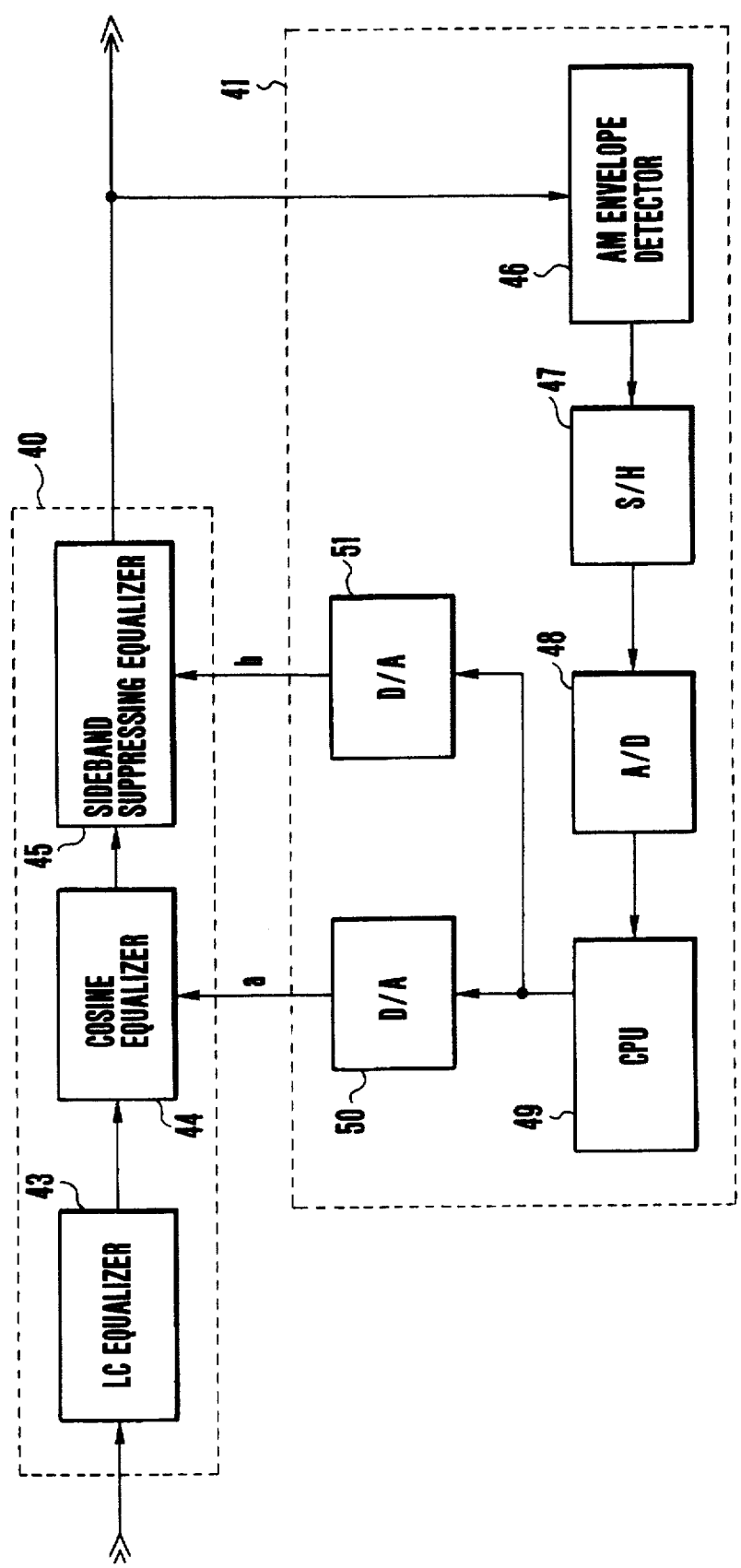
FIG. 12 is a schematic block diagram showing one example of a concrete circuit arrangement of each essential portion of FIG. 11.

As shown in FIG. 12, the equalizer 40 includes three kinds of equalizers which are connected in series, an LC equalizer 43, a cosine equalizer 44 and a sideband suppressing equalizer 45.

Figure 13:
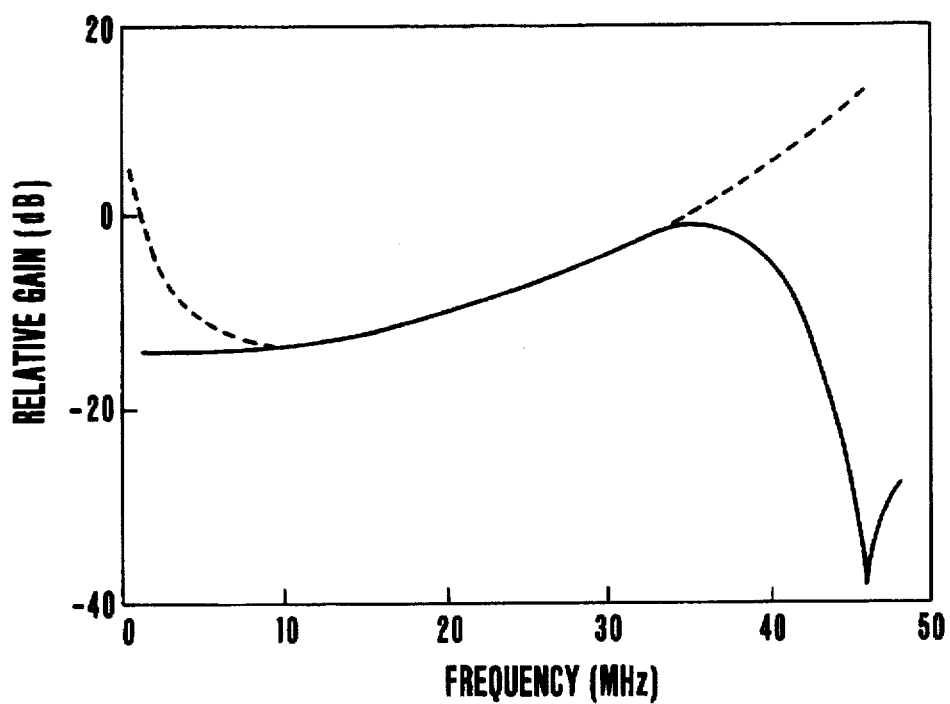
FIG. 13 is a schematic illustration showing the characteristic of the LC equalizer of FIG. 12.

In the LC equalizer 43, an LC filter is used to produce highly accurately the inverse characteristic of the frequency characteristic of the magnetic recording and reproducing system that has been obtained from the recording and reproduction of a single-frequency signal. The LC equalizer 43 compensates for the losses occurring in the magnetic recording part, on the basis of such inverse characteristic. In this embodiment, a rectangular waveform is employed as a recording waveform for a frequency-modulated signal, and even in the condition of the aforementioned wide deviation, it is possible to compensate for the losses occurring in the magnetic recording and reproducing system, by using the LC equalizer 43. The frequency characteristic of the LC equalizer 43 is shown in FIG. 13. In FIG. 13, the solid line represents the characteristic of the LC equalizer 43 and the broken line represents the inverse characteristic of the frequency characteristic of the magnetic recording and reproducing system. The shown equalizer characteristic has a curve which fits the broken line in a frequency-modulated signal band of approximately 7 to 31 MHz and attenuates outside such a band.

Figure 14:
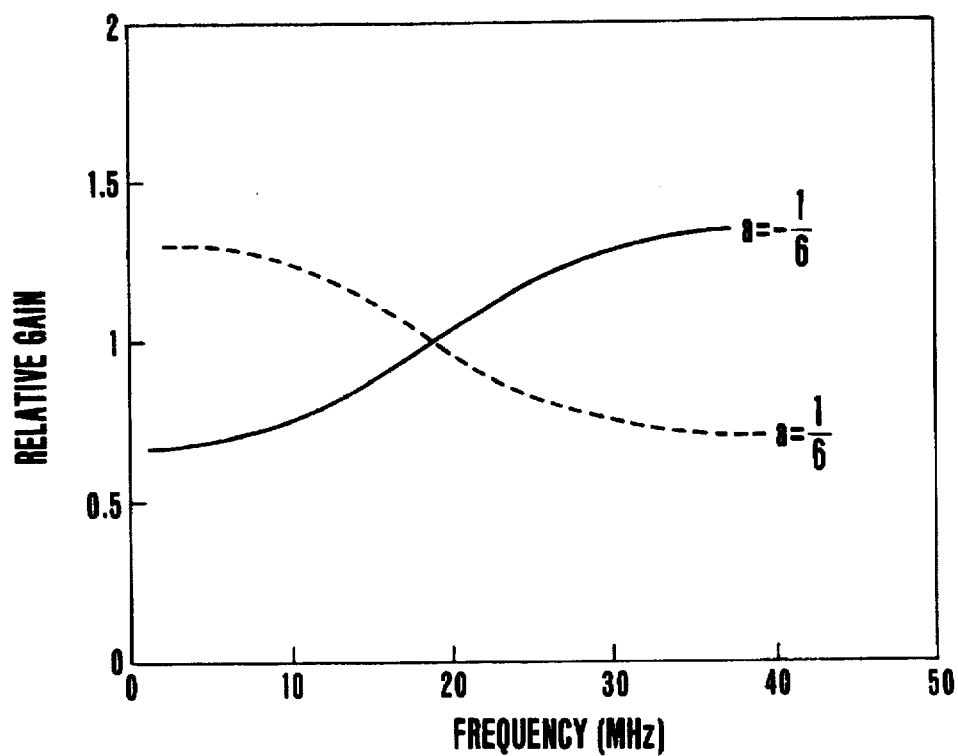
FIG. 14 is a schematic illustration showing the characteristic of the cosine equalizer of FIG. 12.

The frequency characteristic of the cosine equalizer 44 is shown in FIG. 14. In the cosine equalizer 44, it is possible to suppress and emphasize linearly the respective upper and lower sidebands or vice versa about the carrier frequency as described previously. The signal whose losses in the magnetic recording and reproducing system have been compensated for by the LC equalizer 43 is equalized by the cosine equalizer 44 to become a signal having a linearly inclined characteristic curve, whereby a so-called inclined transmission is realized. If the higher frequency band of a signal is suppressed by the cosine equalizer 44, S/N can be set high, while if the higher frequency band is emphasized, an inversion margin can be made large.

Figure 5:
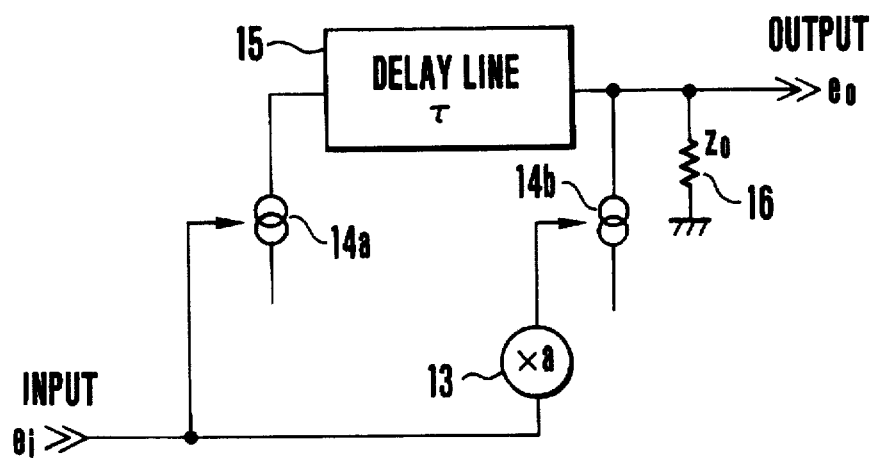
FIG. 5 is a conceptual diagram showing the circuit of the cosine equalizer of FIG. 1.
Figure 6:
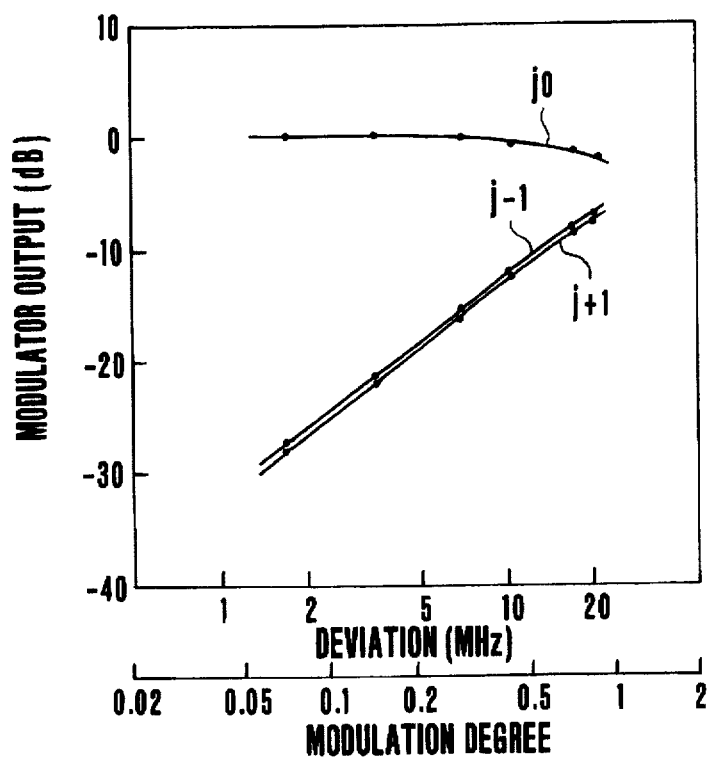
FIG. 6 is a schematic illustration showing the variation, due to deviation, of each spectrum of the frequency-modulated signal outputted from the frequency modulator of FIG. 1.

The conceptual diagram of the circuit of the cosine equalizer 44 is similar to FIG. 5. As described previously, if the coefficient a in FIG. 5 is positive, the equalizer characteristic of suppressing the higher frequency band is obtained, while if the coefficient a is negative, the equalizer characteristic of emphasizing the higher frequency band is obtained. In this embodiment, the cosine equalizer 44 has an arrangement in which the coefficient a can be externally controlled through DC potential, and as described later, the value of the coefficient a is varied to perform automatic equalization.

The frequency characteristic of the sideband suppressing equalizer 45 is as shown in FIG. 9, and the conceptual diagram of its circuit is similar to FIG. 10. If the coefficient b is negative, the equalizer characteristic of suppressing the sidebands is obtained, while if the coefficient b is positive, the equalizer characteristic of emphasizing the sidebands is obtained. In this embodiment, like the cosine equalizer 44, the sideband suppressing equalizer 45 has an arrangement in which the coefficient b can be externally controlled through DC potential.

Referring back to FIG. 12, information indicative of equalization error variations is obtained from the signal whose losses in the magnetic recording and reproducing system have been compensated for by the above-described three kinds of equalizers (the LC equalizer 43, the cosine equalizer 44 and the sideband suppressing equalizer 45), and the cosine equalizer 44 and the sideband suppressing equalizer 45 are controlled on the basis of such information.

In this embodiment, the information indicative of the equalization error variations is obtained from the amplitude value of a reproduced frequency-modulated signal. As shown in FIG. 12, the frequency-modulated signal after equalization by the equalizer 40 is AM-detected (envelope-detected) by an AM envelope detector 46 and is then sampled and held by a sample-and-hold (S/H) circuit 47. Subsequently, the output of the sample-and-hold (S/H) circuit 47 is converted into digital data in an analog/digital (A/D) converter 48 and inputted into a processing unit (CPU) 49. The CPU 49 computes control voltages for the respective coefficients a and b of the cosine equalizer 44 and the sideband suppressing equalizer 45 and outputs the result as digital values. The digital values are respectively converted into analog values in digital/analog (D/A) converters 50 and 51 and are inputted into corresponding multipliers of the respective equalizers 44 and 45.

The following is a description of a signal waveform used for automatic equalization and the operation of the automatic equalization using the signal waveform.

To obtain information indicative of equalization error variations from an equalized frequency-modulated signal, the signal waveform shown in FIG. 15(a) (hereinafter referred to as a "ramp waveform") is employed whose level changes continuously during one horizontal sync period (hereinafter referred to as an "H period").

Figure 16:
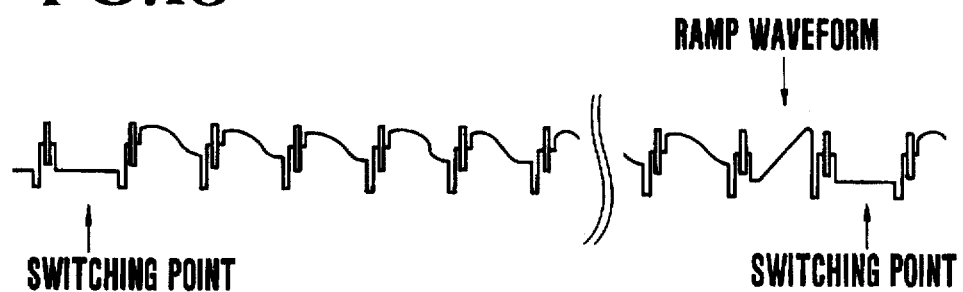
FIG. 16 is a waveform diagram showing the state of insertion of a ramp waveform in a video signal.

The ramp waveform is multiplexed onto a video signal at a predetermined ratio, for example, onto a period near to a switching point in units of 1H period as shown in FIG. 16.

When the ramp waveform is frequency-modulated, the carrier frequency changes from 16 MHz to 22 MHz as the level of the video signal changes from black level to white level. The envelope of the reproduced frequency-modulated signal of the ramp waveform in the output signal of the FQ-CP 9 is as shown in FIG. 15(b). As shown, since the time length of the 1H unit period is extremely long compared to the carrier frequency, the frequency-modulated signal of the ramp waveform is composed of the carrier only and substantial sidebands do not occur. Accordingly, the envelope waveform of FIG. 15(b) (the amplitude is large for the black level and small for the white level) corresponds to the frequency characteristic of the portion 16 MHz to 22 MHz of the magnetic recording and reproducing system which has been obtained by recording and reproducing a single-frequency signal. Since the LC equalizer 43 produces the inverse characteristic of the frequency characteristic of the magnetic recording and reproducing system, the frequency-modulated signal outputted from the LC equalizer 43 has a flat envelope such as that shown in FIG. 15(c). Also, if the initial values of the respective coefficients a and b of the cosine equalizer 44 and the sideband suppressing equalizer 45 are set to zero, the frequency-modulated signal outputted from the equalizer 40 also has a flat envelope such as that shown in FIG. 15(c). To simplify the following explanation, it is assumed that the initial values of the coefficients a and b of both equalizers are zero.

If the characteristics of the magnetic recording and reproducing system vary due to, for example, the wear of a magnetic head, a ramp waveform obtained after equalization may not become flat and equalization error variations corresponding to the characteristic variations of the magnetic recording and reproducing system may take place. As a result, the deterioration of image quality after frequency demodulation may be caused.

For this reason, the envelope of an equalized signal is measured and the equalization error variations corresponding to the characteristic variations of the magnetic recording and reproducing system are automatically compensated for on the basis of the measurement value.

In the equalizer controller 41 of FIG. 12, the envelope of the output of the sideband suppressing equalizer 45 is detected by the AM envelope detector 46, sampled and held, subjected to A/D conversion, and inputted into the CPU 49.

Figure 15A:
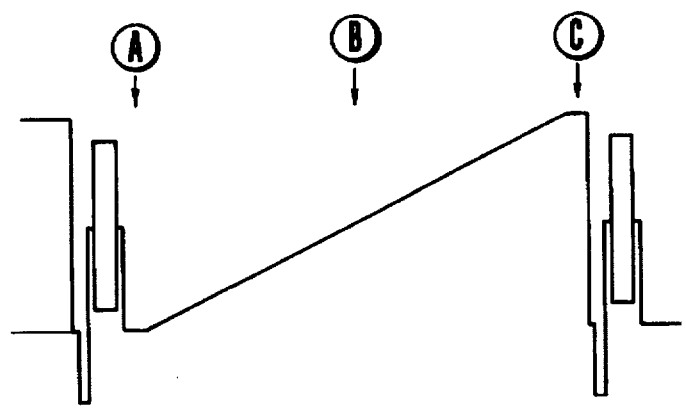
FIGS. 15(a), 15(b) and 15(c) are schematic illustrations showing ramp waveforms, envelopes and the like which appear in each part of FIG. 12.
Figure 15B:
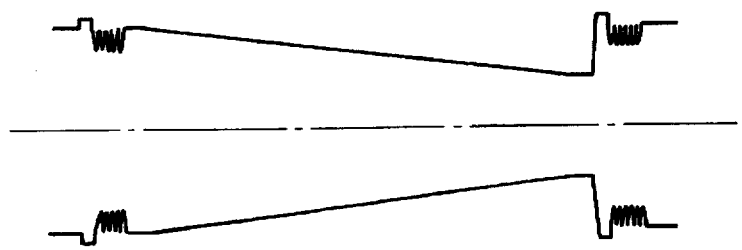
Figure 15C:
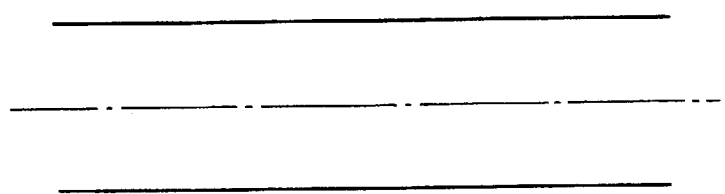

Sampling points of the envelope are shown in FIG. 15(a). The sampling points within the ramp waveform are the following three points:

Ⓐ a point corresponding to the black level (16 MHz);

Ⓑ a point corresponding to a gray level (19 MHz); and

Ⓒ a point corresponding to the white level (22 MHz).

On the basis of measurement values obtained at the three points, the CPU 49 computes a control value for each of the equalizers 44 and 45.

A calculation expression for the cosine equalizer 44 is shown below as Expression (5):

$$Ⓒ - Ⓐ \qquad (5)$$

A variation in the inclination of the frequency characteristic of the magnetic recording part which can be compensated for by the cosine equalizer 44 can be calculated from the difference between Ⓒ which represents the envelope level of a signal of 22 MHz and Ⓐ which represents the envelope level of a signal of 16 MHz. Accordingly, the CPU 49 controls the coefficient a of the cosine equalizer 44 through the D/A converter 50 so that the value of such difference becomes its initial value (in this case, zero).

A calculation expression for the sideband suppressing equalizer 45 is shown below as Expression (6):

$$\text{\textcircled{B}} - \frac{\text{\textcircled{A}} + \text{\textcircled{C}}}{2} \qquad (6)$$

The level difference between the carrier and the sideband, which can be compensated for by the sideband suppressing equalizer 45, can be calculated from the difference between Ⓑ and the average of Ⓐ and Ⓒ. Accordingly, the CPU 49 controls the coefficient b of the sideband suppressing equalizer 45 through the D/A converter 51 so that the value of such difference becomes its initial value (in this case, zero).

With the above-described arrangement, it is possible to constitute an automatic equalizer which can cope with the characteristic variations of the magnetic recording and reproducing system, and it is also possible to prevent deterioration of image quality due to variations with time.

Figure 17A:
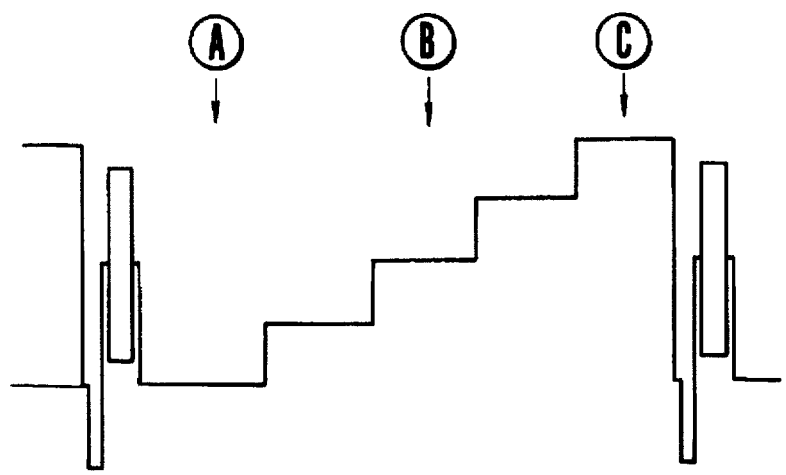
FIGS. 17(a), 17(b) and 17(c) are schematic illustrations showing a staircase waveform, an envelope and the like which appear in each part of FIG. 12.
Figure 17B:
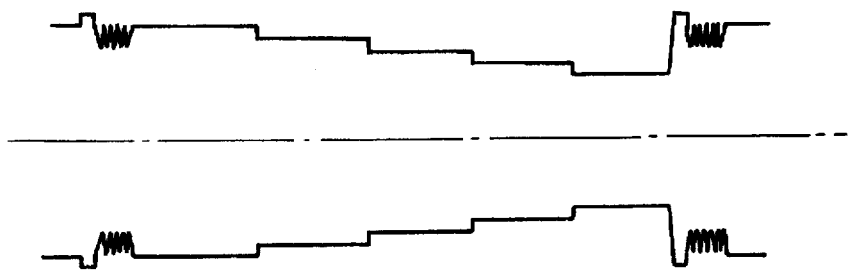
Figure 17C:
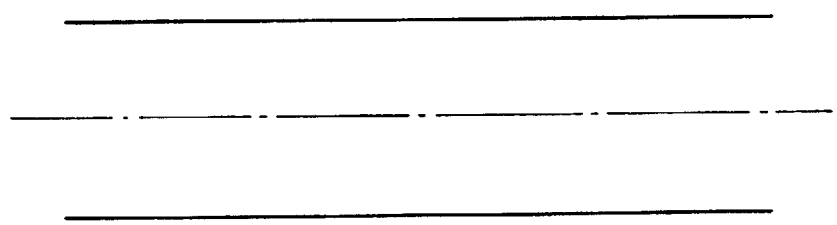

Automatic equalization processing such as the above-described one can also be realized by using a signal waveform in which a video signal level varies in staircase-like form during a 1H unit period as shown in FIGS. 17(a), 17(b) and 17(c) (hereinafter referred to as a "staircase waveform").

In this case as well, the envelope of a reproduced frequency-modulated signal is sampled at three points, Ⓐ the point corresponding to the black level, Ⓑ the point corresponding to the gray level and Ⓒ the point corresponding to the white level, so that it is possible to control the respective coefficients of the cosine equalizer 44 and the sideband suppressing equalizer 45 by using Expressions (5) and (6).

As is apparent from the foregoing description, according to the embodiment explained with reference to FIGS. 11 to 17(a), 17(b) and 17(c), it is possible to constitute a signal reproducing apparatus which is capable of preventing image quality from deteriorating due to variations with time.

Figure 18:
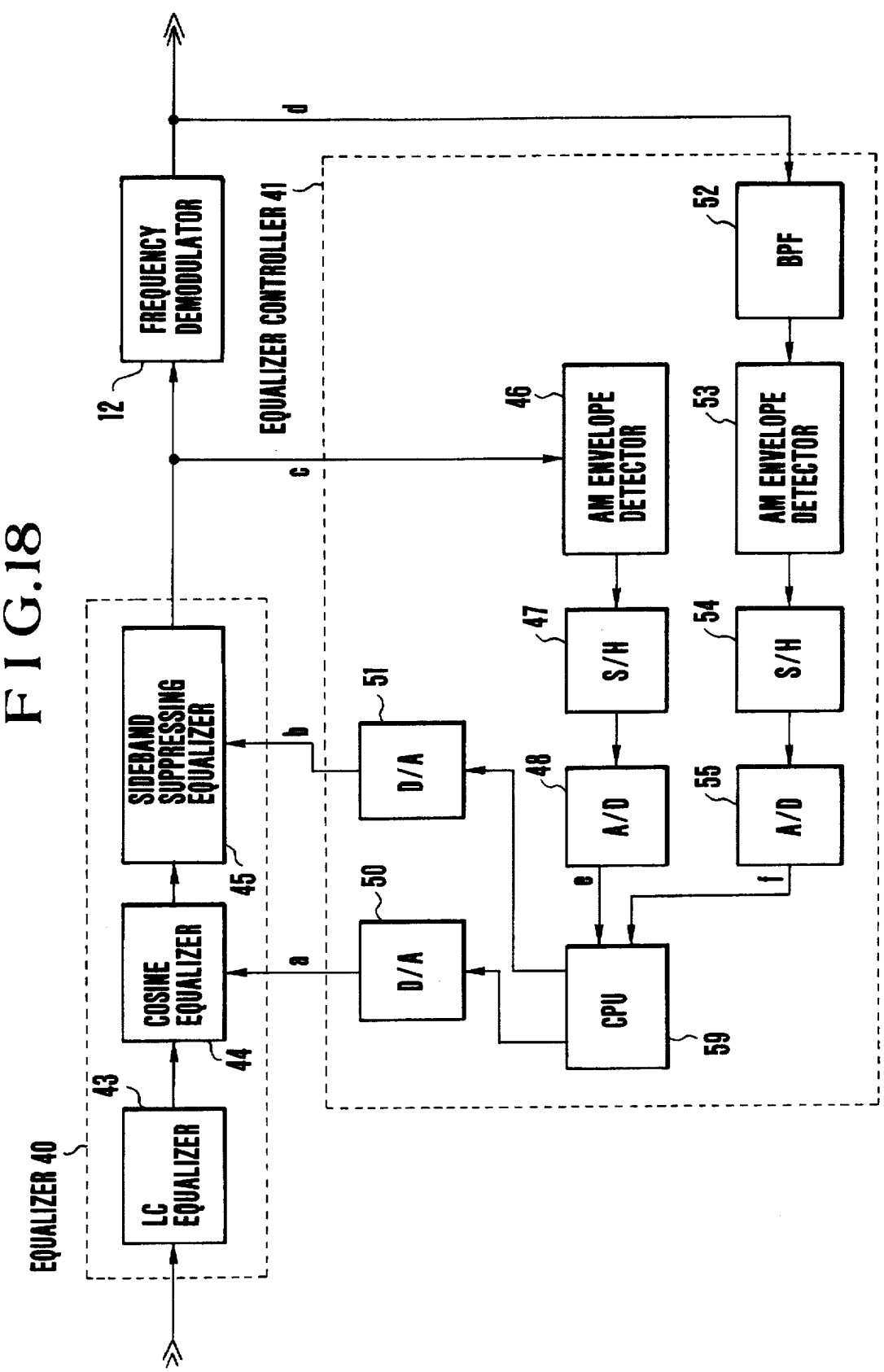
FIG. 18 is a schematic block diagram showing another example of the concrete circuit arrangement of each essential portion of FIG. 11.

FIG. 18 is an explanatory block diagram schematically showing still another embodiment of the present invention. In this embodiment, part of the VTR of FIG. 11 is replaced with the circuit of FIG. 18.

Figure 19A:
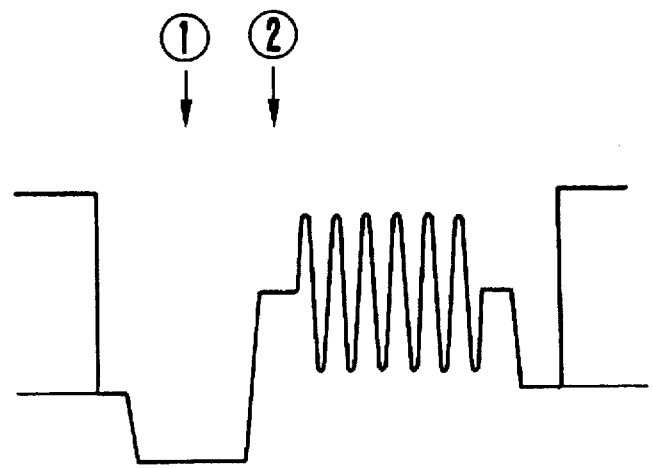
FIGS. 19(a), 19(b) and 19(c) are schematic illustrations showing a burst waveform, an envelope and the like which appear in each part of FIG. 12.
Figure 19B:
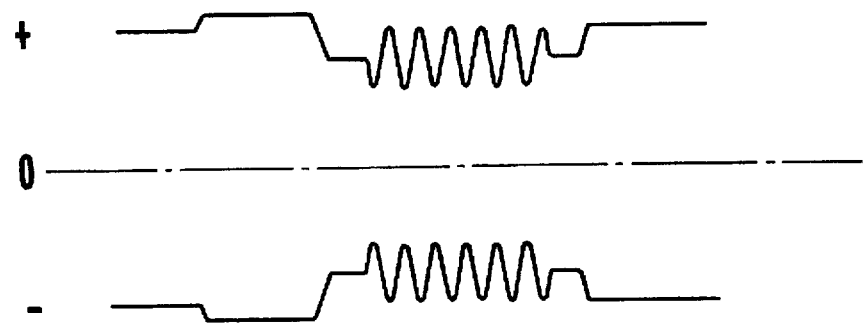

In this embodiment, the equalizer controller 41 obtains information indicative of equalization error variations from a portion which contains a horizontal sync signal and a burst signal. A signal waveform corresponding to this portion is shown in FIG. 19(a). The burst signal is a signal which serves as a reference which is required for a TBC (time base corrector) to generate a clock for eliminating time-base variations due to recording or reproduction, and is composed of six sinusoidal waves of 4.8 MHz with an amplitude of from black level to white level. FIG. 19(b) shows the waveform of the envelope of a frequency-modulated signal which is outputted from the FQ-CP 9 when the burst signal shown in FIG. 19(a) is recorded and reproduced. Since a higher frequency band is suppressed in the magnetic recording and reproducing system, the envelope of a sync tip portion whose carrier frequency is low reaches its maximum and the envelope of a white portion, its minimum.

Figure 19C:
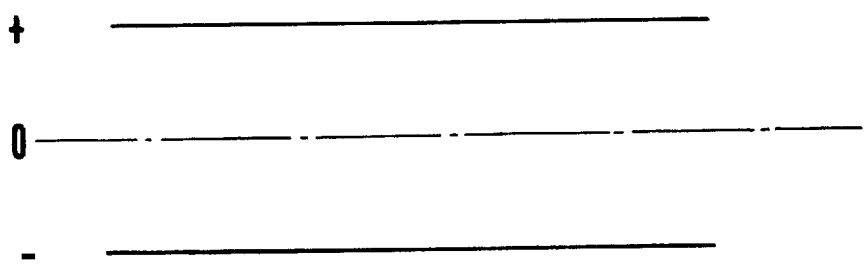

The LC equalizer 43 has a characteristic for compensating for the losses in the magnetic recording and reproducing system, as described previously, and the frequency-modulated signal outputted from the LC equalizer 43 has a flat envelope as shown in FIG. 19(c). The output signal of the equalizer 40 also has a flat envelope as shown in FIG. 19(c) by setting to zero the initial values of the respective coefficients a and b of the cosine equalizer 44 and the sideband suppressing equalizer 45. In the following explanation as well, it is assumed that the initial values of the coefficients a and b of the two equalizers 44 and 45 are both zero. The reproduced frequency-modulated signal whose losses in the magnetic recording part have been compensated for by the equalizer 40 is frequency-demodulated in the frequency demodulator 12, whereby the original waveform signal such as that shown in FIG. 19(a) is obtained.

In the process of obtaining information indicative of equalization error variations from an output c of the sideband suppressing equalizer 45 and an output d of the frequency demodulator 12 in the equalizer controller 41 and performing automatic equalization control of the equalizer 40, this embodiment performs automatic equalization control with two loops, (i) the first loop of obtaining information F indicative of equalization error variations from the output c of the sideband suppressing equalizer 45 and controlling the coefficient a of the cosine equalizer 44 on the basis of the information e and (ii) the second loop of obtaining information f indicative of the equalization error variations from an output d of the frequency demodulator 12 and controlling the coefficient b of the sideband suppressing equalizer 45 on the basis of the information G.

First, the arrangement and operation of (i) the first loop of obtaining the information e indicative of the equalization error variations from the output c of the sideband suppressing equalizer 45 and controlling the coefficient a of the cosine equalizer 44 on the basis of the information e, will be described below with reference to FIG. 18. The cosine equalizer 44 to be controlled has a frequency characteristic which causes a relative gain to be inclined linearly with respect to the frequency of the carrier, as described previously. Accordingly, by sensing the output variations of two kinds of frequencies, it is possible to find equalization error variations which can be compensated for by the cosine equalizer 44. Specifically, this embodiment is intended to utilize two portions, a tip portion, indicated by ① in FIG. 19(a), of the horizontal sync signal and a back porch, indicated by ②, between the horizontal sync signal and the burst signal. If the characteristics of the magnetic recording and reproducing system vary due to, for example, the wear of the magnetic head 4 or 6, an envelope obtained after equalization by the equalizer 40 does not become flat, but the value of the coefficient a is adjusted to keep such an envelope flat as shown in FIG. 19(c). Thus, automatic equalization control is performed.

To realize the automatic equalization control, as shown in FIG. 18, the envelope of the output c of the sideband suppressing equalizer 45 is detected by the AM (amplitude modulation) envelope detector 46, and the detected envelope is sampled and held by the sample-and-hold (S/H) circuit 47. Subsequently, the output of the sample-and-hold (S/H) circuit 47 is converted into a digital value e in the analog/digital (A/D) converter 48 and the digital value e is inputted into a CPU (central processing unit) 59. Sampling points for the envelope are two, the tip (14 MHz) of the horizontal sync signal ① of FIG. 19(a) and the back porch (19 MHz) ② of FIG. 19(a). The CPU 59 performs the following substraction using the measurement values ① and ② obtained at the two points:

$$F = \text{\textcircled{2}} - \text{\textcircled{1}} \qquad (7)$$

Thus, by obtaining the difference F between ①, the output of 19 MHz, and ②, the output of 14 MHz, by means of the CPU 59, it is possible to compute an variation in the inclination of the frequency characteristic of the magnetic recording part, which can be compensated for by the cosine equalizer 44. This computation may also be realized by looking up a table. The result of the computation is converted into the analog value of the coefficient a in the D/A (digital-to-analog) converter 50, and is then inputted into the cosine equalizer 44. Thus, the equalization coefficient a of the cosine equalizer 44 is controlled so that the value of the difference F in Expression (7) becomes its initial value (in this case, zero).

The following description refers to the arrangement and operation of (ii) the second loop of obtaining the information G indicative of the equalization error variations from the output d of the frequency demodulator 12 and controlling the coefficient b of the sideband suppressing equalizer 45 on the basis of the information G. The sideband suppressing equalizer 45 to be controlled has a frequency characteristic which causes an upper sideband and a lower sideband to be suppressed or emphasized at the same ratio with respect to a carrier, as described previously. Suppressing or emphasizing the upper and lower sidebands in this manner is apparently equivalent to varying the degree of modulation of a frequency-modulated signal. Accordingly, by sensing the amplitude value of the burst signal in the equalizer controller 41, it is possible to find equalization error variations which can be compensated for by the sideband suppressing equalizer 45. If the amplitude of the burst signal becomes large, the sidebands are suppressed, while if the amplitude of the burst signal becomes small, they are emphasized.

To realize this processing, as shown in FIG. 18, only a signal of 4.8 MHz is extracted from the output d of the frequency demodulator 12 by a band-pass filter (BPF) 52 having a characteristic which allows passage of 4.8 MHz, the frequency of the burst signal. Subsequently, the envelope of the output of the BPF 52 is detected by an AM envelope detector 53, and the envelope level of the detected burst signal is sampled and held by a sample-and-hold (S/H) circuit 54. Subsequently, the output of the sample-and-hold (S/H) circuit 54 is converted into a digital value f in an analog/digital (A/D) converter 55 and the digital value f is read into the CPU (central processing unit) 59. The CPU 59 compares the read amplitude value of the burst signal with a predetermined reference value, and controls and varies the value of the coefficient b of the sideband suppressing equalizer 45 through the D/A converter 51 so that the difference value G becomes zero.

In the above-described manner, since the set values of the coefficients a and b used in the respective equalizers are controlled and varied on the basis of a reproduced burst signal or the like, even if the characteristics of the magnetic recording and reproducing system vary, an envelope after equalization can be kept flat, whereby the image quality of a reproduced image is stabilized.

What is claimed is:

1. A reproducing apparatus, comprising:
   (a) input means for inputting a frequency-modulated (FM) signal passed through a magnetic recording and reproducing system; and
   (b) equalizing means for equalizing the FM signal input by said input means,
   said equalizing means having a cosine equalizing means which emphasizes a frequency component corresponding to an upper sideband but does not emphasize a frequency component corresponding to a lower sideband so as to compensate deterioration of the frequency component corresponding to an upper sideband relative to a carrier of the FM signal by the magnetic recording and reproducing system, and sideband equalizing means for emphasizing or suppressing simultaneously the frequencies corresponding to the upper and lower sidebands so as to compensate variation of ratio between the carrier of the FM signal and the frequency components corresponding to the upper and lower sidebands, said cosine equalizing means and said sideband equalizing means being arranged in series.

2. An apparatus according to claim 1, wherein said equalizing means further includes an adjustment circuit which automatically adjusts an emphasis ratio or suppression ratio of said sideband equalizing means by using the FM signal passed through said equalizing means.

3. An apparatus according to claim 2, wherein the FM signal includes a ramp portion having a ramp waveform, which has no sideband component of the frequency modulation, and said adjusting circuit is arranged to adjust the emphasizing ratio or the suppressing ratio of said sideband equalizing means in accordance with an envelope level of the ramp portion of the FM signal passed through said equalizing means.

4. An apparatus according to claim 1, wherein said equalizing means further includes an adjustment circuit for adjusting an emphasis ratio or suppression ratio of said cosine equalizing means.

5. An apparatus according to claim 1, wherein said sideband equalizing means and said cosine equalizing means are connected in series.

6. An apparatus according to claim 1, wherein said equalizing means further includes a compensating circuit having a characteristic which compensates for a frequency characteristic of said input means.

7. An apparatus according to claim 6, wherein said sideband equalizing means, said cosine equalizing means and said compensating circuit are connected in series.

8. An apparatus according to claim 1, further comprising frequency discriminating means for frequency-demodulating the frequency-modulated signal passed through said equalizing means.

9. A signal processing apparatus, comprising:
   (a) signal input means for inputting a frequency-modulated signal;
   (b) equalizing means for equalizing the frequency-modulated signal input by said input means, said equalizing means including a plurality of equalizing circuits having different characteristics, respectively, said plurality of equalizing circuits being arranged in series and including a sideband equalizing circuit emphasizing or suppressing a frequency corresponding to the side bands with respect to a carrier of the frequency-modulated signal, and includes a linear equalizing circuit for emphasizing a frequency corresponding to an upper sideband and suppressing a frequency corresponding to a lower sideband, or emphasizing the frequency corresponding to the upper sideband and suppressing the frequency corresponding to the lower sideband, with respect to a frequency corresponding to a carrier of the frequency modulated signal;
   (c) frequency discriminating means for frequency demodulating the frequency-modulated signal passed through said equalizing means; and
   (d) adjust means for adjusting two characteristics different from each other among the plural characteristics according to the signal passed through the frequency discriminating means and the signal to be input in the frequency discriminating means.

10. An apparatus according to claim 9, wherein said control is arranged to adjust an emphasizing ratio or suppressing ratio of said sideband equalizing circuit in accordance with the signal output from said frequency discriminating means and an emphasizing ratio or suppressing ratio of the linear equalizing circuit in accordance with the frequency-modulated signal to be input to said frequency discriminating means.

11. An apparatus according to claim 9, further comprising reproducing means for reproducing the frequency-modulated signal from a recording medium.

12. An apparatus according to claim 11, further comprising compensating means for compensating a reproduction frequency characteristic of said reproducing means.

13. An apparatus according to claim 12, wherein the recording medium includes a magnetic tape.

14. An apparatus according to claim 13, further comprising output means for outputting a signal passed through said frequency discriminating means.

15. A reproducing apparatus, comprising:

(a) input means for inputting a frequency-modulated (FM) signal passed through a magnetic recording and reproducing system;

(b) a first equalizer having cosine equalizing means which emphasizes a frequency component corresponding to an upper sideband but does not emphasize a frequency component corresponding to a lower sideband so as to compensate deterioration of the frequency component corresponding to the upper sideband relative to a carrier of the FM signal by the magnetic recording and reproducing system; and (c) a second equalizer which emphasizes or suppresses simultaneously the frequency components corresponding to the upper and lower sidebands to compensate variation in a ratio between the carrier of the FM signal and the frequency components corresponding to the upper and lower sidebands due to the magnetic recording and reproducing system, said first and second equalizers being arranged in series.

16. An apparatus according to claim 15, further comprising means for demodulating the FM signal passed through the second equalizer.

17. A method of reproducing and equalizing a frequency-modulated (FM) signal, comprising the steps of:

(a) inputting the FM signal passed through a magnetic recording and reproducing system;

(b) compensating deterioration of a frequency component corresponding to an upper sideband relative to a carrier of the FM signal by the magnetic recording and reproducing system by cosine equalizing to emphasize the frequency component corresponding to the upper sideband and not to emphasize a frequency component corresponding to a lower sideband; and (c) emphasizing or suppressing simultaneously the frequency components corresponding to the upper and lower sidebands to compensate variation in a ratio between the carrier of the FM signal and the frequency components corresponding to the upper and lower sidebands due to the magnetic recording and reproducing system, the (b) step being effected prior to the (c) step.

* * * * *

UNITED STATES PATENT AND TRADEMARK OFFICE
CERTIFICATE OF CORRECTION

PATENT NO. : 5,663,844
DATED : September 2, 1997
INVENTOR(S) : Gohda et al.

It is certified that error appears in the above-identified patent and that said Letters Patent is hereby corrected as shown below:

Col. 10, line 14, delete "information e" and insert -- information F --.

Col. 10, line 15, delete "information f" and insert -- information G --.

Col. 10, line 20, delete "information e" and insert -- information F --.

Col. 10, line 23, delete "information e" and insert -- information F --.

Signed and Sealed this

Seventeenth Day of March, 1998

Attest:

BRUCE LEHMAN

Attesting Officer

Commissioner of Patents and Trademarks